(12) United States Patent
Ducher et al.

(10) Patent No.: US 8,956,137 B2
(45) Date of Patent: Feb. 17, 2015

(54) ASSEMBLY FOR A TABLETTING PRESS

(75) Inventors: Roland Ducher, Gaujac (FR); Sylvere Jouve, Saint Victor la Coste (FR)

(73) Assignee: AREVA NC, Paris (FR)

( * ) Notice: Subject to any disclaimer, the term of this patent is extended or adjusted under 35 U.S.C. 154(b) by 1 day.

(21) Appl. No.: 13/996,776

(22) PCT Filed: Dec. 20, 2011

(86) PCT No.: PCT/EP2011/073333
§ 371 (c)(1),
(2), (4) Date: Jun. 21, 2013

(87) PCT Pub. No.: WO2012/084893
PCT Pub. Date: Jun. 28, 2012

(65) Prior Publication Data
US 2013/0302460 A1 Nov. 14, 2013

(30) Foreign Application Priority Data

Dec. 22, 2010 (FR) ..................................... 10 61013

(51) Int. Cl.
*B29C 43/34* (2006.01)
*B29C 43/00* (2006.01)
*B30B 15/30* (2006.01)

(52) U.S. Cl.
CPC .............. *B29C 43/006* (2013.01); *B30B 15/304* (2013.01)
USPC .......... 425/78; 425/110; 425/129.1; 425/150; 425/345; 141/71

(58) Field of Classification Search
CPC .... B29C 43/06; B29C 43/34; B29C 43/3405; B29C 43/3422; B30B 15/304

USPC ............ 425/78, 110, 129.1, 150, 345; 141/71
See application file for complete search history.

(56) References Cited

U.S. PATENT DOCUMENTS

| | | | |
|---|---|---|---|
| 3,559,244 A * | 2/1971 | Grether et al. | ................. 425/148 |
| 5,352,112 A | 10/1994 | Moore | |
| 2005/0056339 A1* | 3/2005 | Beane | .............................. 425/78 |
| 2009/0256271 A1 | 10/2009 | Engelvin et al. | |

FOREIGN PATENT DOCUMENTS

| | | |
|---|---|---|
| CN | 101291802 A | 10/2008 |
| CN | 101291802 B1 | 7/2012 |
| DE | 102006001626 A1 | 7/2007 |
| EP | 1 052 086 | 11/2000 |

(Continued)

OTHER PUBLICATIONS

French Preliminary Search Report in French Application No. 1061013, dated Sep. 16, 2011.

(Continued)

*Primary Examiner* — Joseph S Del Sole
*Assistant Examiner* — Thu Khanh T. Nguyen
(74) *Attorney, Agent, or Firm* — Nixon Peabody LLP

(57) ABSTRACT

Pellet fabrication device comprising a powder distributor and a table provided with cavities to be filled with powder, on which the distributor moves. The distributor comprises two assemblies of rollers cooperating with rails fixed on the table on each side of the distributor displacement zone, a set of rollers being used to guide displacement of the distributor and a set of rollers being used to press the distributor in contact with the table.

20 Claims, 7 Drawing Sheets

(56) References Cited

FOREIGN PATENT DOCUMENTS

| | | |
|---|---|---|
| FR | 2624485 A1 | 6/1989 |
| FR | 2624485 B1 | 4/1992 |
| FR | 2892051 A1 | 4/2007 |
| GB | 913387 | 12/1962 |
| GB | 1 474 328 | 5/1977 |
| JP | 2001-252791 A | 9/2001 |
| JP | 2001252791 A | 9/2001 |
| WO | 0207939 A1 | 1/2002 |
| WO | 2007/045624 | 4/2007 |

OTHER PUBLICATIONS

International Search Report, PCT/EP2011/073333, dated Mar. 23, 2012.

First Chinese Office Action and Search Report in Chinese Application No. 2011800625483, dated Aug. 20, 2014.

* cited by examiner

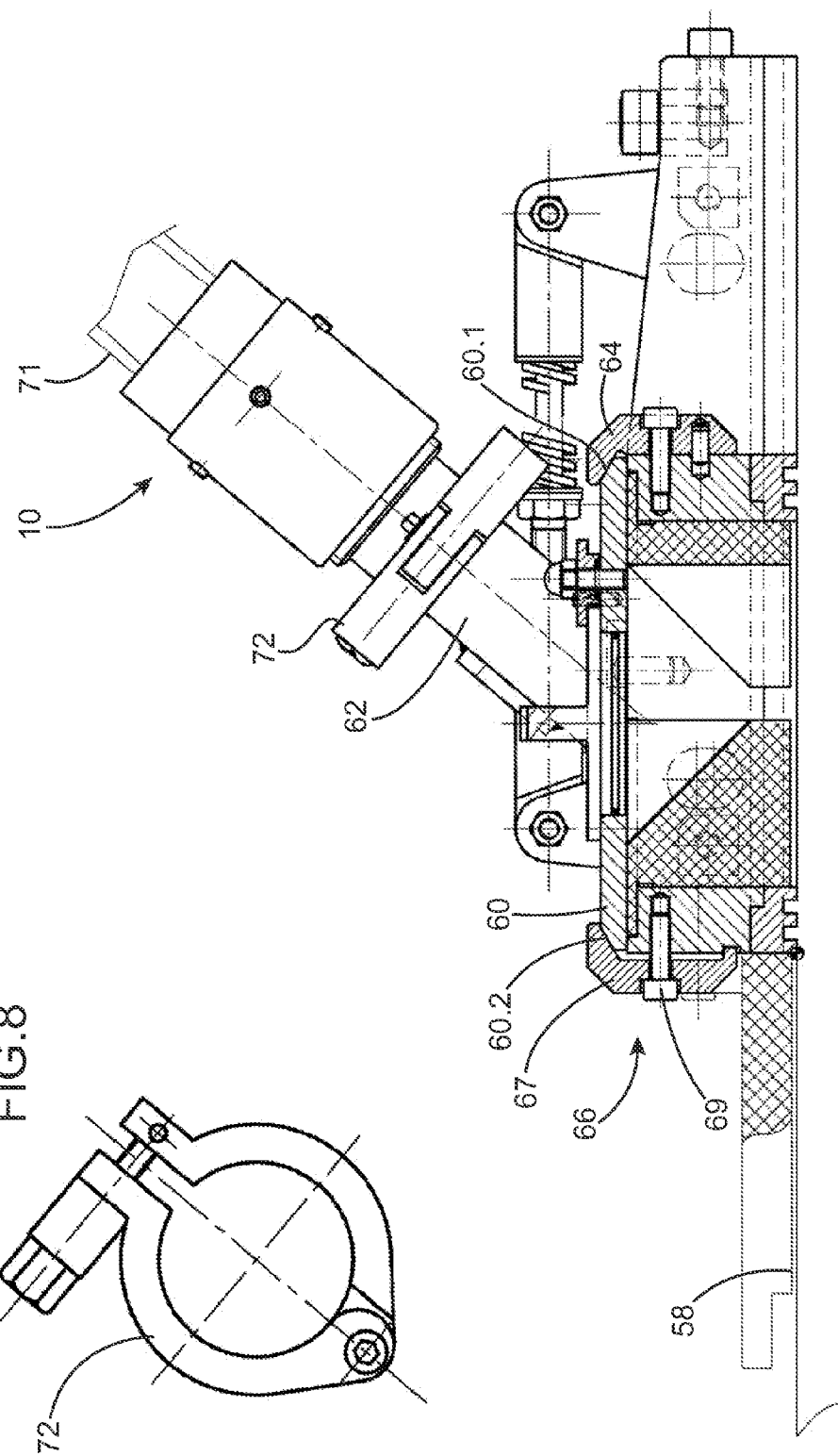
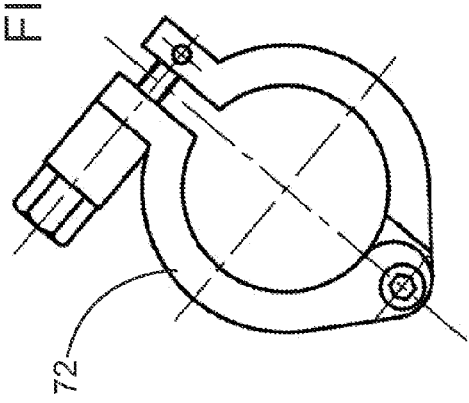

ASSEMBLY FOR A TABLETTING PRESS

CROSS REFERENCE TO RELATED APPLICATIONS OR PRIORITY CLAIM

This application is a National Phase of PCT/EP2011/073333, filed Dec. 20, 2011, entitled, "ASSEMBLY FOR A TABLETTING PRESS", which claims the benefit of French Patent Application No. 10 61013, filed Dec. 22, 2010, the contents of which are incorporated herein by reference in their entirety.

TECHNICAL DOMAIN AND PRIOR ART

This invention relates to an assembly for fabrication of pellets from a powder, for example used for the fabrication of nuclear fuel pellets, for example MOX (mixed plutonium oxide and uranium oxide) type pellets.

The fabrication of nuclear fuel pellets comprises the following steps:
  filling of a mould or cavity with the shape of a pellet, using a distributor,
  displacement of the distributor to release the mould thus filled in,
  then pressing using a first and a second punch penetrating into the mould,
  removal of the pellets.

Such a distributor, also called a moulding shoe, is disclosed for example in document FR 2892051. This shoe comprises means for fabrication of pellets with uniform characteristics capable of reducing the cycle time for fabrication of nuclear fuel pellets.

This shoe is very satisfactory for the fabrication of nuclear fuel pellets.

The distributor has to be pressed in contact with the table as it moves over the cavities. It is usually pressed by means of pneumatic actuators. The distributor is then complex in structure, which makes it relatively large. Moreover, movement of the shoe is guided by two slides inside which the shoe slides. The powder can escape from the shoe and fill the slides, which can cause jamming of the shoe.

Note that this operation takes place in a glove box. Therefore, it is useful to reduce the size of the devices used. The actuators are also supplied with pneumatic fluid under pressure which requires an external supply outside the glove box.

PRESENTATION OF THE INVENTION

Consequently, one purpose of this invention is to disclose a powder distributor into moulding cavities, for example to make nuclear fuel pellets and that is much simpler to make than existing distributors.

This purpose is achieved by a system for filling at least one moulding cavity comprising a powder distributor and a table with cavities to be filled with powder, on which the distributor moves. The distributor comprises two assemblies of rollers cooperating with rails fixed on the table on each side of the distributor displacement zone, a set of rollers being used to guide displacement of the shoe and a set of rollers being used to press the distributor in contact with the table. The table comprises rolling tracks for the rollers, for example rails arranged on both sides of the cavities which are oriented along the displacement direction of the distributor.

The means for guiding displacement of the shoe and the means for pressing the shoe in contact with the table are supported solely by the distributor and the table, and they are then fairly compact. They are also relatively simple to make.

The main subject-matter of the present invention is then an assembly for the fabrication of pellets from a powder material, comprising a powder distributor and a table in which cavities are formed on which the distributor can move, said powder distributor comprising a casing with a cover provided with means connecting it to at least one powder supply conduit connected to a hopper, two side walls and two end walls, said distributor being capable of moving the powder in a to and fro movement on a plane along a determined displacement direction, said assembly comprising means of guiding the distributor along the displacement direction and means of pressing the distributor in contact with the table, in which said guide means comprise at least two guide rollers installed on each side wall, said guide rollers having rotation axes perpendicular to a plane of the table, said guide rollers cooperating with a guide running track fixed relative to the table, and in which said pressure means comprise at least two pressure rollers on each side wall, said pressure rollers having rotation axes perpendicular to the displacement direction and parallel to the plane of the table, each pressure roller cooperating with a pressure running track fixed relative to the table.

The assembly advantageously comprises two rails fixed to the table on each side of the distributor supporting the pressure running track and the guide running track.

For example, each rail has a C-shaped cross section open towards the distributor, the cross-section comprising a lower branch for attachment of the rail on the table and an upper branch supporting the pressure and guide running tracks.

Advantageously, the assembly comprises means of adjusting the pressure force between the distributor and the table. These adjustment means may comprise an elastic means mounted free to react between two pressure rollers on one side wall and an elastic means mounted free to react between the two pressure rollers on the other side wall and means capable of modifying the preload on each of the elastic means. For example, each pressure roller is mounted free to rotate on a part that is itself free to rotate on the side wall about an axis of rotation parallel to the axis of rotation of the pressure roller and separate from it, each elastic means being mounted bearing between the parts supporting the pressure rollers, variable length connecting means connecting the two parts to adjust the preload on the elastic means.

The variable length connecting means may comprise threaded rods connecting the two parts, each elastic means being free to rotate about a threaded rod, said threaded rods cooperating with the parts supporting the rollers by screwing.

Preferably, the cover comprises two bevelled end edges, one of the end walls of the distributor comprising at least one bevelled bill under which one of the bevelled end edges of the cover is located and the other end wall comprises a fixed part and a removable part provided with at least one bevelled bill that will bear on the other bevelled end of the cover.

The fixed part may advantageously comprise screws and the removable part is provided with U-lags inside which the screws fit.

In the example embodiment, the table comprises several cavities and the distributor comprises means of grouping the powder along separate axes approximately parallel to the displacement direction to fill the cavities, each cavity being located along a grouping axis, the grouping means being supported by walls of the casing perpendicular to the displacement direction and having a saw tooth section along a plane parallel to the displacement plane.

The assembly preferably comprises downstream grouping means and upstream grouping means relative to the displacement direction.

The cavities may be arranged in at least one row, in which the downstream grouping means are offset transversely from the upstream grouping means by a half tooth width, such that one tooth tip is facing the bottom between two consecutive teeth, and in which the distance separating the cavities is equal to the distance separating the bottoms of the teeth, the distributor being arranged on the table so that when it moves, each bottom between two teeth covers a cavity in the table.

Another subject-matter of the present invention is a pellet fabrication device comprising an assembly according to this invention, a displacement actuator conferring a to and fro movement on the distributor along the first displacement direction, a hopper capable of containing a powder material and routing means to move the powder material from the hopper to the distributor.

The actuator is advantageously connected to the distributor through a swivel connection.

The powder material routing means may comprise at least one conduit connected to the cover and to the hopper, the conduit comprising a pipe formed from metal turns embedded in a synthetic material, and connectors to each of its ends. For example, the connectors may be fixed to the cover and to the hopper by bolted articulated collars.

The bolted articulated collar fixed to one of the connectors connecting the conduit to the hopper may be mounted on an articulated stirrup free to rotate on said connector.

Preferably, the articulated rotation of the stirrup on said connector comprises a clearance along the axis of the connector and a transverse clearance.

The fabrication device according to the invention may comprise several supply conduits between the hopper and the distributor.

The pellet fabrication device is particularly suitable for the fabrication of nuclear fuel pellets.

BRIEF DESCRIPTION OF THE DRAWINGS

This invention will be better understood after reading the description given below and with reference to the appended drawings in which:

FIG. 7 is a longitudinal sectional view of the distributor in FIG. 2 along plane DD, FIG. 8 is a top view of an example embodiment of a bolted articulated clamping collar that can be used to connect supply conduits to the distributor and/or to the hopper.

DETAILED PRESENTATION OF PARTICULAR EMBODIMENTS

The terms "shoe" and "distributor" are used indistinctly in the following description. The "front" and "back" refer to parts to the left and to the right respectively on the view in FIG. 2.

The following description describes the invention used for the fabrication of nuclear fuel pellets; however, the invention is also applicable to fabrication of any type of pellets made of any material. This invention is not restricted to the nuclear industry.

Figure 1:
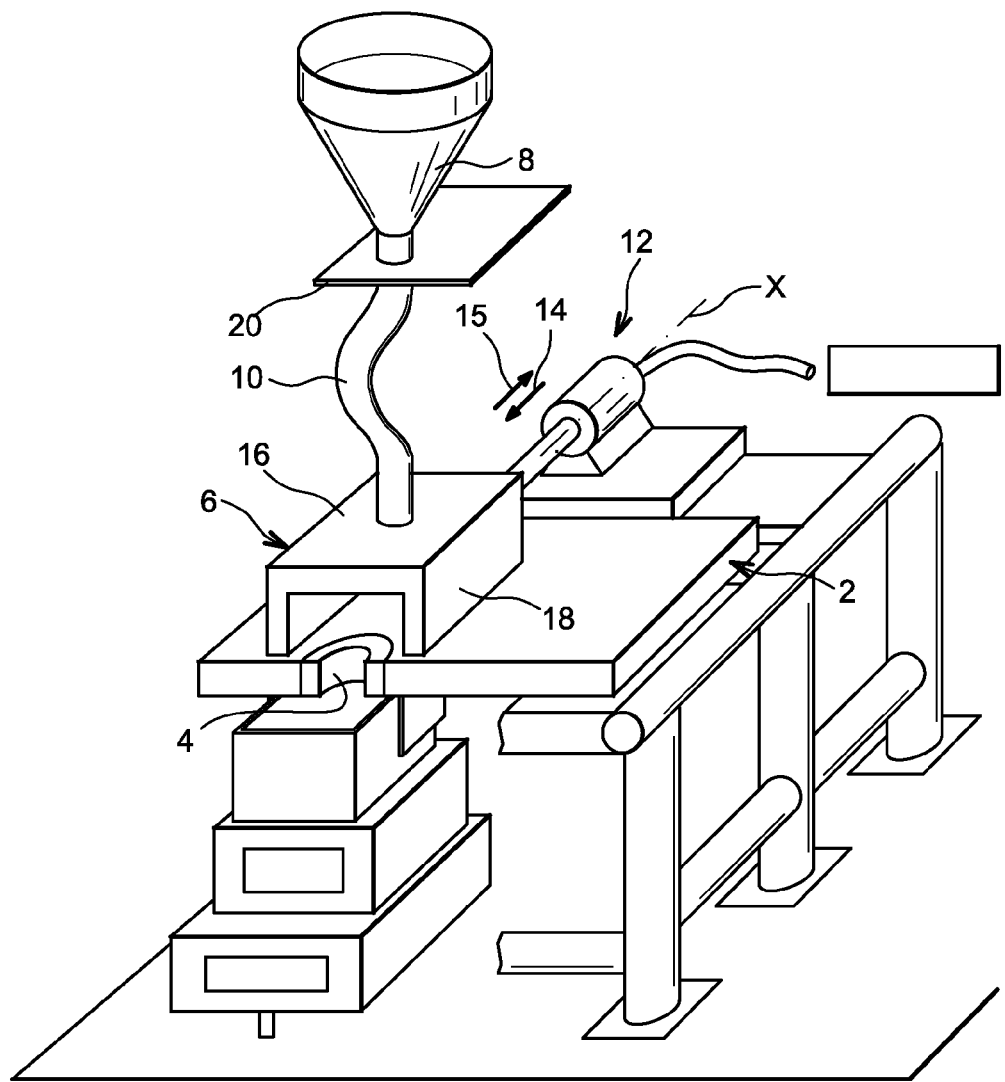
FIG. 1 is a diagrammatic view of a nuclear fuel pellet fabrication device.

FIG. 1 diagrammatically shows a pellet fabrication device comprising a table 2 with at least one cavity 4 with an orifice inside which the powder to be pressed will be placed, a shoe or powder distributor 6 that will move over the cavity 4, a supply hopper 8 connected to the shoe through a pipe 10, and a means 12 for moving the shoe 6 along an X axis, this means 12 advantageously performing a to and fro movement along the direction of arrows 14 and 15.

The shoe 6 is formed by a casing comprising a cover 16 and walls, the pipe 10 being connected to the cover 16.

The powder contained in the hopper 8 flows in the pipe 10 to reach the shoe 6. The shoe 6, under the action of the displacement means 12, moves longitudinally in a to and fro movement along the X axis along the direction of the arrows 14 and 15 and distributes the powder in the cavity 4. A valve (not shown) is provided to control the powder flow between the hopper and the distributor.

Figure 2:
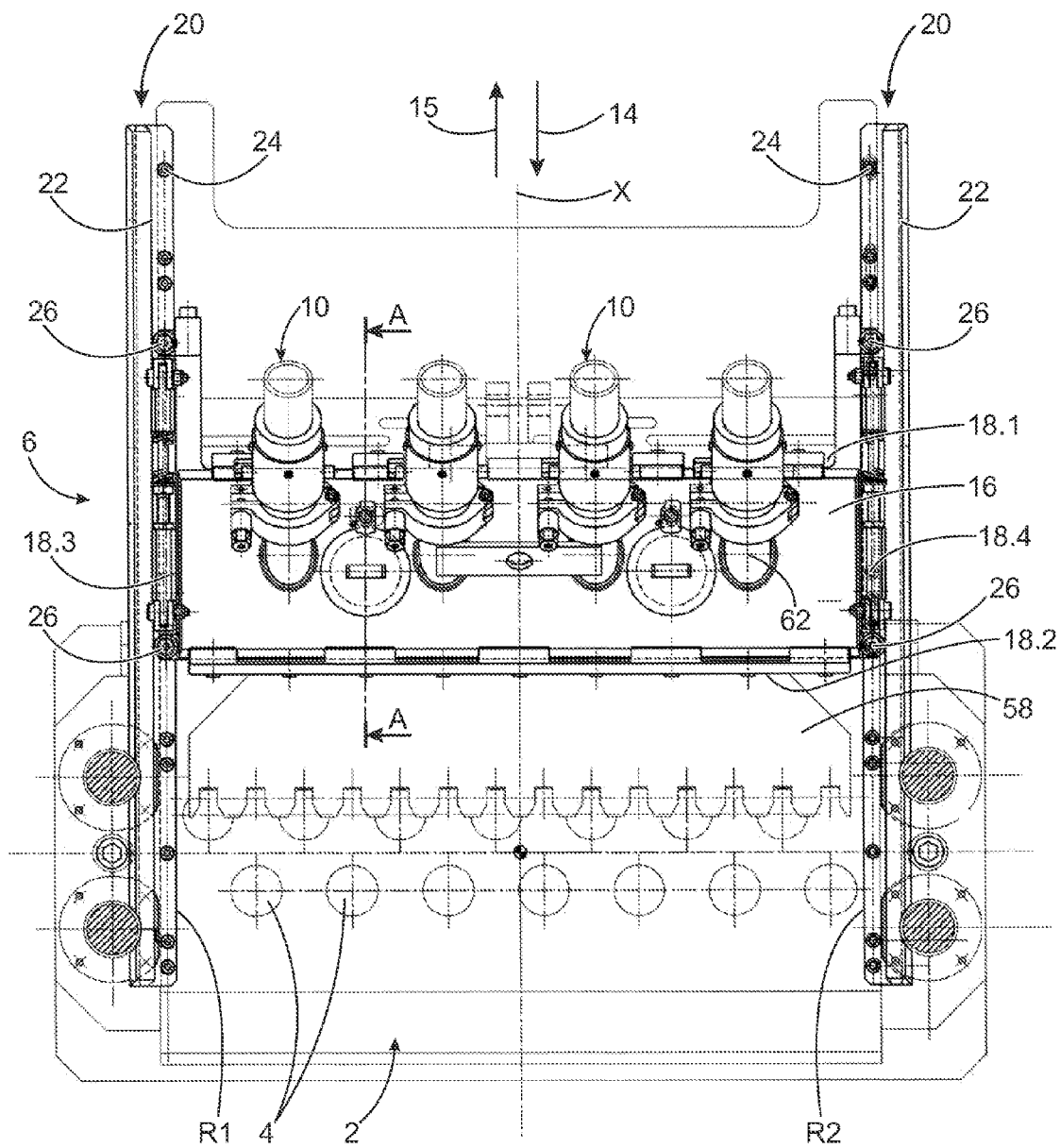
FIG. 2 is a top view of an example embodiment of a powder distributor and table assembly according to this invention.

FIG. 2 shows a detailed view of an example embodiment of a shoe and table assembly according to this invention. The casing comprises walls 18.1 and 18.2 perpendicular to the X axis, the wall 18.2 called the front wall preceding the wall 18.1 called the back wall along the direction indicated by the arrow 14, and sidewalls 18.3, 18.4 parallel to the X direction, connect the ends of the front wall 18.1 and the back wall 18.2 respectively.

The shoe 6 will move on the table 2 along the X axis, between an extreme withdrawn position in which the shoe does not cover the cavities 4 and an extreme forward position in which the pellets can be removed.

In the example shown, the table 2 comprises 14 cavities distributed along two rows approximately perpendicular to the X axis. In the example shown, the cavities have a circular section; the cavities may be any other shape depending on the type of pellets to be moulded.

The table 2 is advantageously free to move along a direction perpendicular to the plane of the table.

In the example embodiment, four powder supply pipes 10 are connected to the cover 16, for a uniform supply of powder in the distributor 6.

The assembly comprises means 20 of guiding the shoe 6 along the X axis and pressing the shoe 6 onto the table 2. In the example shown, the means 20 comprise two rails 22 fixed on the surface of the table 2 parallel to the X axis on each side of the cavities 4. The rails are separated from each other approximately by the width of the shoe measured perpendicular to the X axis. The rails 22 are fixed on the table for example by means of screws 24.

Figure 4:
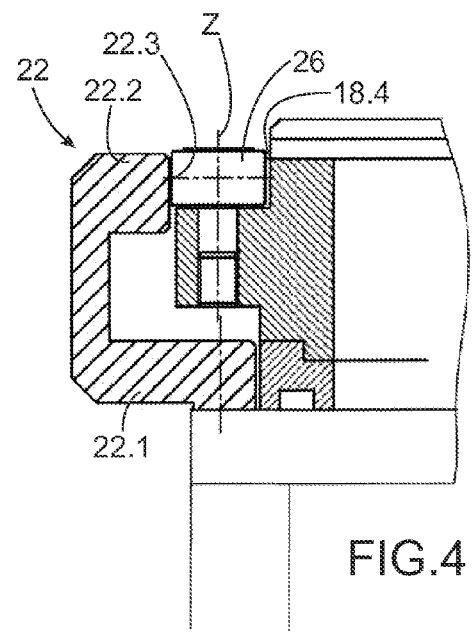
FIG. 4 is a sectional view along plane AA in FIG. 3.
Figure 5:
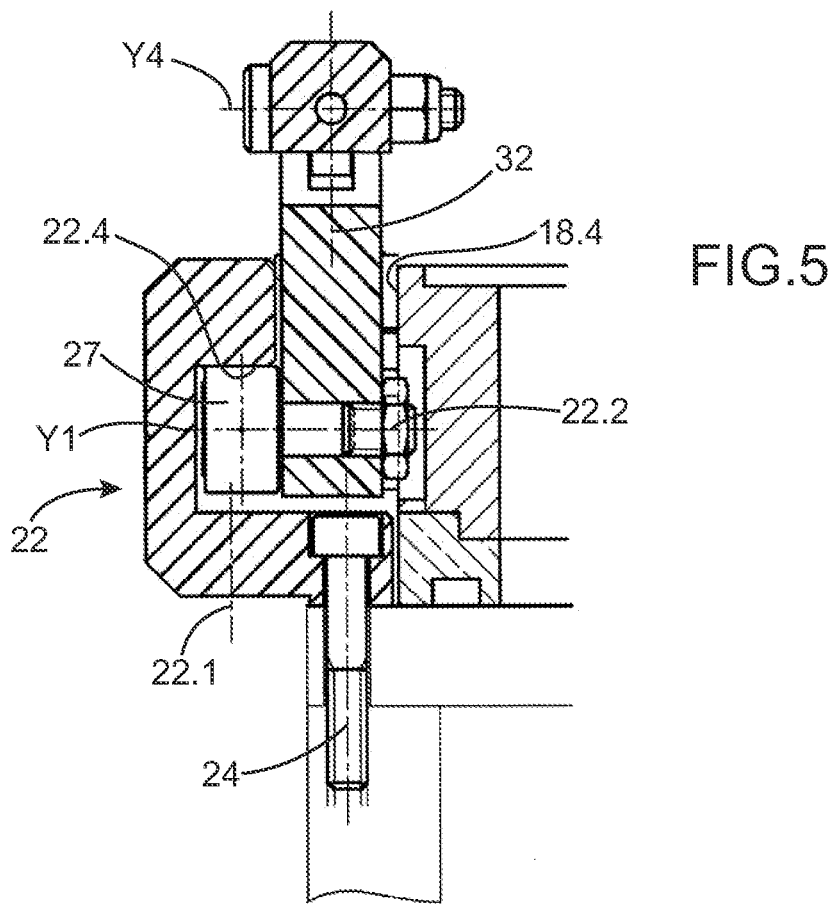
FIG. 5 is a sectional view along plane BB in FIG. 3.
Figure 6:
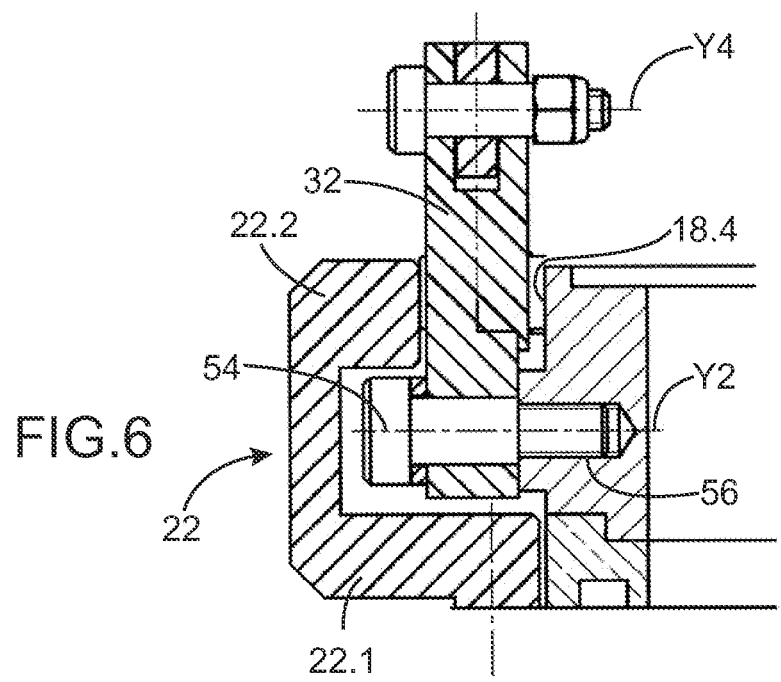
FIG. 6 is a sectional view along plane CC in FIG. 3.

FIGS. 4 and 5 show a cross section of one of the rails 22, approximately C-shaped, the opening of which faces a sidewall 18.4 of the shoe in the view in FIGS. 4 to 6.

The lower branch 22.1 of the C comprises bores at its free end for fixing the rail on the table by means of screws 24. Preferably and as shown, the depth of the lower branch is greater than the depth of the upper branch 22.2 to facilitate fixing the rail 22 on the table 2.

Other types of attachments of the rails 22 onto the table 2 could be envisaged, for example fixing by welding.

The guide and pressure means 20 comprise two sets of rollers, a first set guiding the shoe along the X axis by cooperating with rails 22, and a second set that will press the shoe 6 in contact with the surface of the table 2 by cooperating with rails 22.

The first set of rollers comprises two pairs of rollers 26, two rollers 26 being arranged on each side edge 18.3, 18.4 of the shoe 6. Preferably, a roller 26 is fitted at the forward end of the sidewall 18.3, 18.4 and a roller 26 is fitted at the back end of the sidewall 18.3, 18.4.

FIG. 4 shows details of a guide roller 26 of the first assembly bearing on a rail 22. The guide rollers 26 have a rotation axis Z perpendicular to the plane of the table 2. The guide running track of the guide rollers 26 is supported by a side face 22.3 of the upper branch 22.2 contained in a plane perpendicular to the table.

The two back guide rollers are preferably located in a single plane perpendicular to the X axis, and the two front guide rollers are also preferably located in a single plane perpendicular to the X axis. This arrangement simplifies fabrication. Guidance is also improved. This longitudinal guidance of the shoe 6 by lateral bearing prevents risks of jamming due to presence of the powder.

The second set of rollers comprises pressure rollers 27, two rollers 27 being placed on each sidewall 18.3, 18.4 of the shoe 6. Preferably, a pressure roller 27 is installed at the forward end of the sidewall 18.3, 18.4 and a roller 27 is installed at the back end of the sidewall 18.3, 18.4.

Figure 3:
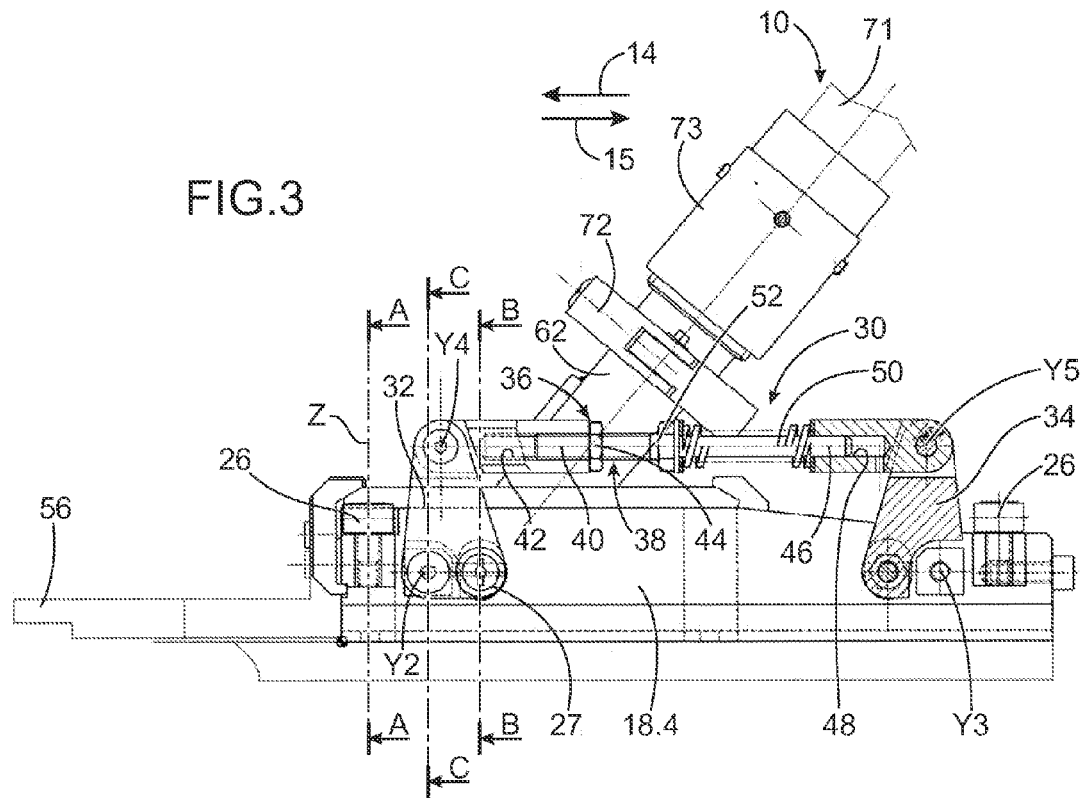
FIG. 3 is side view of the distributor in FIG. 2.

In the view shown in FIG. 3, the guide rollers 26 are advantageously arranged further towards the outside than the pressure rollers 27, which simplifies the shape of the rails. But this arrangement is not limitative. For example, it would be possible to have one or several guide rollers between the two pressure rollers.

FIG. 5 shows the detail of a roller 27 of the second set bearing on a rail 22. The pressure rollers 27 have a rotation axis Y1 parallel to the plane of the table and perpendicular to the longitudinal axis X. The pressure running track is formed by an inner face 22.4 of the upper branch 22.2 of the rail 22.

The shape of the rails may be different. For example, the rails could have an S-shaped section such that the lower branch is outside the space delimited between the two rails 22, since only the upper branch is useful for guidance and for pressing.

Means 30 of adjusting the pressure force applied on the shoe to press it in contact with the surface of the table are also provided. The adjustment means 30 are best seen in FIG. 3.

Separate adjustment means 30 are provided for each pair of lateral rollers. Since the adjustment means are similar, we will only describe the adjustment means located on the right side of the shoe in the view in FIG. 2.

The adjustment means 30 will vary the pressure force of the shoe on the table by means of a spring, for which the preload is adjusted as a function of the required pressure level.

The adjustment means 30 form eccentric type systems.

In the example shown, each pressure roller 27 of a sidewall 18.3, 18.4 is mounted articulated on a part 32, 34 free to rotate about an axis Y2, Y3 respectively, parallel to and distinct from the rotation axis of the pressure rollers 27.

In the example shown, the parts 32 34 are approximately in the form of a triangle, one corner supporting a roller 27, one corner being articulated in rotation on the shoe and one corner on which the adjustment means are articulated. By adjusting the angular orientation of the parts 32, 34, the preload on the springs is increased or decreased and the force between the shoe and the table is varied.

Variable length connection means 36 connect the two parts 32, 34. The parts 32, 34 pivot around their axis by modifying the length of the connecting means 36, which modifies the spring tension.

The rotation axis Y2 of the part 32 is located at the forward edge of the shoe 6 and the rotation axis Y3 of the part 34 is located at the back edge of the shoe. Thus, when the length of the connection means 36 is modified, the parts 32, 34 pivot in opposite directions and the rollers 27 move vertically along the same direction.

As a variant, the rotation axes of parts 32, 34 may be located inwards from the rollers 27.

The connection means 36 are installed free to rotate about axes parallel to the Y4, Y5 axes. The connection means 36 comprise a rod 38 fitted with a threaded end portion 40 that is screwed into a threaded bore 42 formed in the part 32, and a lock nut 44 to prevent rotation of the rod 38 in the bore 42. The rod 38 comprises a second end portion 46 installed in a bore 48 in the part 34. The end portion 46 is free to slide in the bore 48 that may for example be fitted with friction bushings. The spring 50 is mounted free to react between the part 34 and a nut 52 mounted on the rod 38.

The load in the springs 50 of the two adjustment means determines the force between the shoe and the table. By increasing the pressure force, the seal can be increased and the movement forces are also increased. A compromise is then chosen between the degree of leak tightness of the shoe as it slides on the table and the force necessary to move the shoe on the table. These adjustment means are relatively simple in construction and are very robust.

The shoe slides on the table and is guided by its contact on the table. It is not supported by rollers running on rails, which makes the structure of the installation less complex and adjustment of the pressure simpler.

The adjustment means enable easy remote adjustment. Very advantageously in the example shown, the adjustment is made solely by manipulating the nut 52 to adjust the two rollers on the same side simultaneously, which is particularly advantageous in the case of a nuclear installation in a glove box.

FIG. 6 shows details of the rotation axes Y2, Y3 of parts 32, 34. These axes are formed by screws 54, one end of which is fixed in a bore 56 on the side edge of the shoe. The parts 32, 34 are mounted around an intermediate part of the screws, the screw heads forming side stops. The heads are housed inside the rail 22, without any interaction with it.

The shoe is displaced along the X axis following an alternating left to right movement as seen looking at the view in FIG. 2. This movement is advantageously applied by an electric actuator one end of which is connected to the back end of the shoe 6. The use of a different type of actuator, for example a hydraulic actuator, is not outside the scope of this invention.

Advantageously, a swivel connection is provided between the actuator and the shoe. A swivel connection is also advantageously provided between the actuator and the frame of the pellet fabrication device.

In the example shown with reference to FIG. 2, the shoe 6 comprises a comb shaped part 58 fixed onto the front wall of the casing. The comb 58 will push pellets ejected from the cavities to bring them onto a conveyor (not shown) circulating along the table. The conveyor will bring the pellets towards a sintering furnace.

This comb 58 is fixed removably onto the front wall 18.2 by means of screws 59. The comb 58 preferably comprises U-lags (not visible) in which the screws 59 (FIG. 10) are placed so that the screws do not have to be removed, all that will be necessary will be to simply loosen the screws to remove the comb.

The cover 16 of the shoe is formed by a plate 60 provided with connectors 62 to which the supply conduits 10 are connected.

In the advantageous example shown particularly clearly in FIG. 7, the plate 60 of the cover 16 is held in place by clamping onto the sidewalls 18.3, 18.4 of the shoe casing. The plate 60 comprises bevelled back 60.1 and front 60.2 edges. The upper end of the back wall 18.1 of the casing comprises a plurality of cleats 64 forming bills under which the bevelled back edge 60.2 is fitted. The cleats 64 thus form a back stop for the cover 16. It would be possible to replace the cleats by a single part extending over the entire width of the casing.

On the front, a removable clamping part 66 is provided also fitted with a bill 67 forming its upper edge. The bill 67 bears in contact with the bevelled forward edge 60.2 of the plate 60.

The clamping part 66 may for example be mounted on the front wall of the casing by means of screws 69 screwed into the wall and penetrating into U-lags (not visible) formed in the clamping part 66.

This assembly tightens the plate in contact with the back cleats 64 and in contact with the front wall of the casing. All that is necessary to install and remove the cover 16 is to loosen the easily accessible screws 69, which is faster than attachment of the cover by means of screws screwed directly into the plate 60 around its entire contour.

Advantageously, each supply conduit 10 comprises a pipe 71, preferably made of steel turns encased in a synthetic material such as PVC, for which there is no risk of trapping, for example in case of a negative pressure. Therefore the risk of the pipe breaking is very much reduced.

For example, each conduit is connected to the shoe by means of a collar 72, of the bolted articulated collar type like that shown by itself in FIG. 8. The conduit 10 comprises a connection sleeve 73 mounted on the pipe, the collar 72 squeezing the connection sleeve 73 and the connection end 62 fixed to the cover 16. Other connection means could be envisaged.

The supply conduits are connected to the hopper, preferably also by bolted articulated collars. These may be of the same type as those connecting the conduits to the shoe.

Figure 9A:
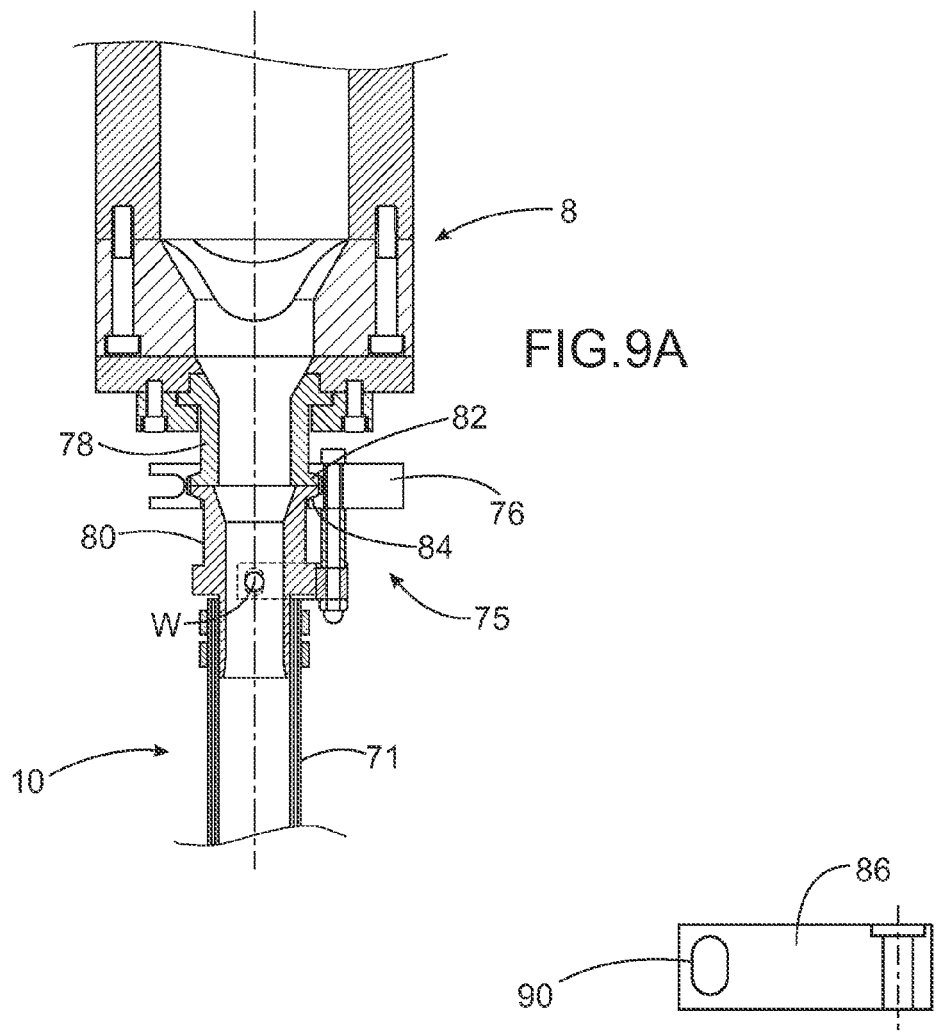
FIG. 9A is a front view of the connection between the hopper and the supply conduit connected to the distributor.
Figure 9B:
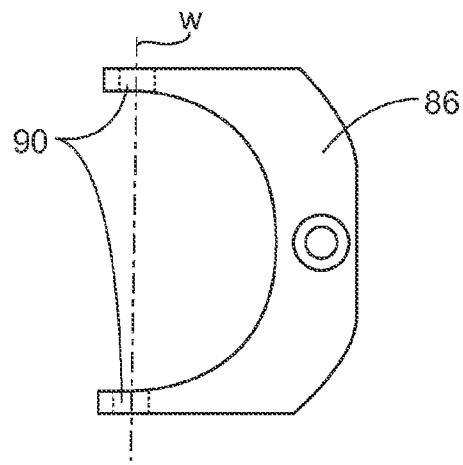
FIG. 9B is a top and side view of the stirrup alone used in the connection in FIG. 9A.

Preferably, as shown in FIG. 9A, each conduit is fixed to the hopper by means of a clamping device 75 articulated onto the conduit. The clamping device 75 comprises a bolted articulated clamping collar 76 similar to the collar in FIG. 8 and an assembly stirrup 86 of the collar 76 on the conduit, shown by itself in FIG. 9B. Thus, the clamping collar 76 is brought up at the same time as the conduit 10. It is remembered that the entire pellet fabrication device is in a glove box, the inside of which is only accessible through glove ports, and the conduits are attached to the hopper using one hand at arm length.

The lower bottom of the hopper comprises connection end pieces 78 projecting outwards, to which sleeves 80 mounted in the pipe are fixed.

The end of the connection end piece 78 and the end of the sleeve 80 that will come into contact with each other, each comprises an annular flange ring 82, 84 that will be held in contact with each other by means of the collar 76. Preferably, the flange rings are tapered and the groove of the collar has a corresponding shape, to facilitate automatic centring of the connection sleeve and the connection end piece.

The stirrup 86 is mounted articulated in rotation onto the connection sleeve 80 around an axis W perpendicular to the centre line of the connection sleeve 80. The articulation axis of the two articulated parts of the collar 76 is mounted in the stirrup 86. Thus, the two parts of the collar are articulated on the stirrup 86.

The rotation axis W of the stirrup 86 on the connection sleeve 80 is formed by two pins installed in two blind bores made in the connection sleeve 80. Preferably, the stirrup 86 is mounted articulated on the sleeve 80 with clearance. A clearance is provided on the axis of the connection sleeve 80. This clearance is obtained by installing the pins in oblong bores 90 made in the stirrup 86. A radial clearance is also provided at the rotation axis of the stirrup on the connection sleeve 80.

The connection of the supply conduits on the hopper is easier to make and to use.

Figure 10:
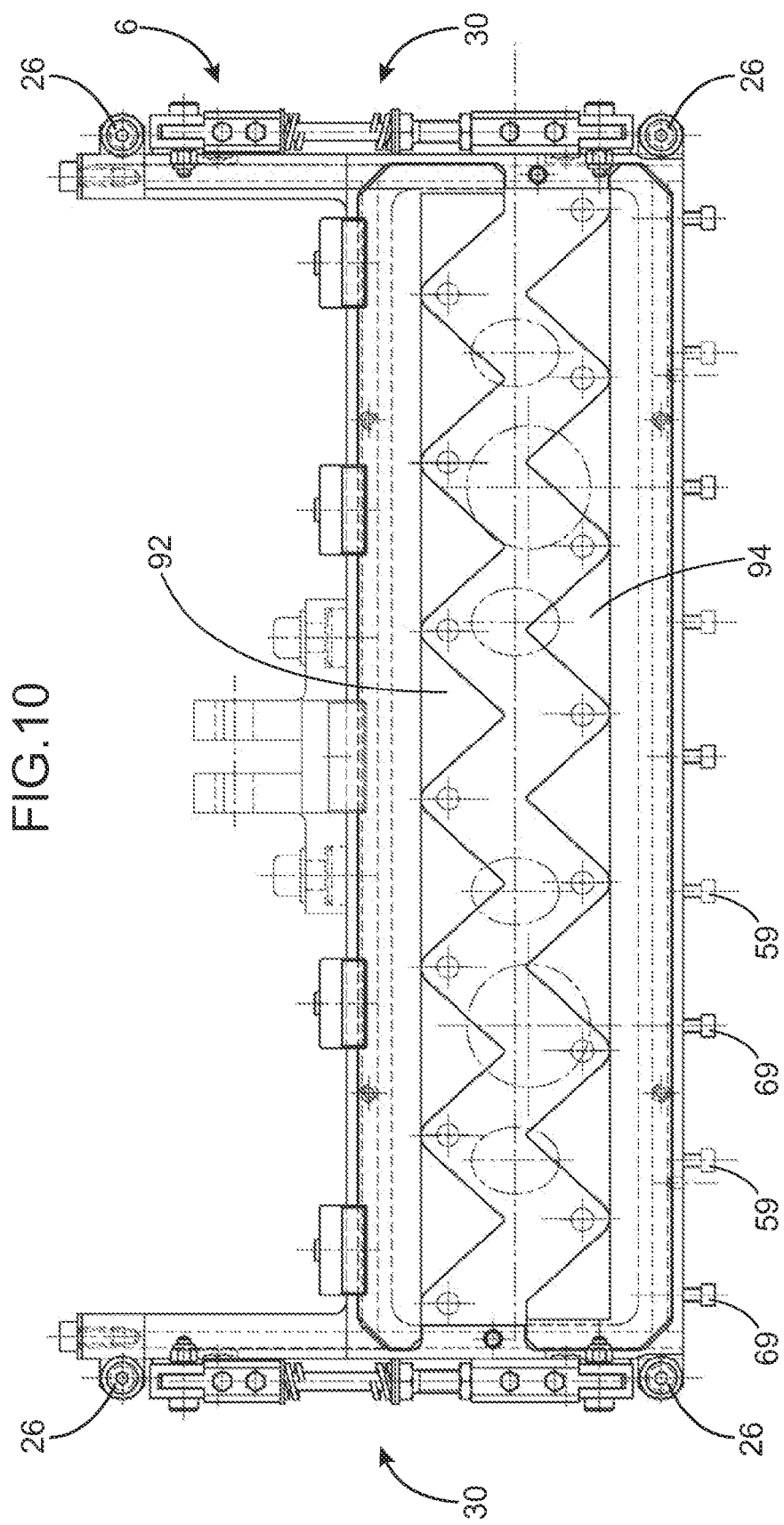
FIG. 10 is a top view of the distributor, the cover having been removed.

In the example shown in FIG. 10, the shoe 6 comprises inner plates 92, 94 provided with means of bringing the powder together along distinct paths so as to move the powder towards each cavity, by a large shoe surface area. This reduces sticking of the powder and bond to the walls. The plates have a saw tooth profile, so that powder can be gathered and guided along paths parallel to the X axis passing through the bottom part between two teeth, these paths crossing a cavity 4.

The tip of the saw teeth may be more or less rounded. The bottoms are advantageously delimited by an arc of a circle, preventing powder retention.

Advantageously, the dimensions of the plate 92 are the same as the dimensions of the plate 94.

The plate 94 faces the plate 92. Advantageously, the teeth of the plate 94 are offset along the Y axis relative to the teeth of the plate 92. Advantageously, the offset is half a tooth width.

In the example shown, the profiles of the plate 92 and of the plate 94 are complementary.

Advantageously, the plates 92, 94 are removable and are fixed inside the casing. Thus, there is no need to replace the entire shoe in order to replace the plates. Consequently, the upper wall of the casing is also removable.

For example, the casing may be made from stainless steel and the grouping means may be made from polymer.

Therefore the design of the shoe according to this invention is simpler.

Advantageously, the inner faces of the shoe are made of mirror polished stainless steel, which limits powder retention inside the shoe and risks of compaction of the powder. The result is efficient filling of the first and second rows with higher flows.

During filling, the shoe moves with a to and fro movement in the direction of arrows 14 and 15, along the X axis.

Advantageously, the table is mounted free to move along a vertical Z axis orthogonal to the X direction and to the Y direction. Since the actuator is fitted free to rotate at its two ends, both on the shoe and on the actuation device, the shoe entirely moves with the table.

The to and fro movement of the shoe is advantageously sinusoidal or triangular.

A sinusoidal type displacement mode can achieve a flow of the order of 9 grams of powder per second, and a triangular type displacement for the shoe movement can achieve flows of the order of 8 grams per second.

A shaking axis and shaking amplitude on each side of this axis are defined on a press model. The shaking axis corresponds to the central axis between the two rows of cavities and the shaking amplitude covers the cavities with powder from the shoe. The position of the shaking axis can be modified, in other words its position can be made asymmetric relative to the two rows of cavities, to adjust a filling asymmetry between the front row and the back row.

We will now describe filling of the cavities in the first row R1, the cavities in the second row R2 being filled symmetrically.

When the shoe moves along the direction 15, the saw tooth profile of the grouping means collects the powder between each pair of teeth, the powder moves along the teeth towards the bottoms. The bottoms are aligned with the cavities 4 of the first row R1, and arranged behind the first row R1 before filling, consequently they meet the cavities 4 of row R1, the powder collected in the bottoms is brought over the cavities 4 in row R1 at a certain time and drops into them. Filling of the cavities is increased if the powder is delivered more efficiently by the means 92 providing a large surface area to move the powder.

The same phenomenon occurs for the second row R2 when the shoe moves along the direction 15.

Not all powder necessary to make a pellet falls into each cavity at the same time, and filling is done in several passes by means of the to and fro displacement of the shoe. This filling in several steps results in good filling uniformity.

The combined to and fro movement of the shoe and the upwards movement of the table thus creates a phenomenon of suction of the powder towards the inside of the cavities. Since the lower punch is fixed, lifting the table increases the free volume of the cavities, causing suction of the powder.

Advantageously, the grouping means may be made free to move relative to the casing, for example by providing an excitation device capable of applying small amplitude displacements so as to make the grouping means vibrate along the X direction.

Spring type suspension means may advantageously be associated with the excitation device, so that the powder can be made to vibrate at low frequencies and with high amplitude, giving uniform distribution of the powder over the entire surface of the shoe. These movements can be combined or chained with smaller amplitude and/or lower frequency vibrations, to break cohesion of the powder, make it more fluid and fill the cavities satisfactorily.

An excitation device could be provided for each plate or a single excitation device could be provided for the two plates, the plates for example being rigidly connected together.

For example, the excitation device may comprise an electromagnetic excitation device, for example a vibrating pot, or it may be of the piezoelectric excitation device type. The use of vibrating pots has the advantage that it enables large frequency and large amplitude ranges. Any other type of excitation device could be suitable, for example of the magnetic type.

The pellet fabrication device as described above advantageously comprises means of controlling the displacement of the shoe and also control of the excitation device, according to cycles determined so as to assure "repeatability" of filling of the cavities. High amplitude vibrations at the beginning of the cycle and then lower amplitude vibrations and/or variable frequency vibrations would also be possible.

A pellet fabrication method making use of the distributor will now be described.

The fabrication method comprises the following steps:
a) put the shoe into position on the cavities, the shoe comprising means of grouping the powder along distinct axes,
b) fill the cavities by shaking the grouping means,
c) remove the shoe,
d) compress the powder,
e) remove the pellets.

In step b), the shoe casing performs to and fro movements (for example seven or eight to and fro movements) and/or the grouping means are put into vibration to enable uniform distribution of the powder and prevent cohesion of powder particles. The lower punch may be moved during this filling to cause a suction effect.

In step c), the shoe is displaced backwards on table 2 with a high amplitude in comparison with the to and fro movements during shaking, so as to completely expose the cavities for approaching the upper punch.

In step d), the powder is pressed between an upper punch and a lower punch for a determined time. A variation in the upper punch displacement velocity during pressing is possible.

The table is lowered in step e), causing ejection of the pellets from the cavities, and the shoe then makes a large forward movement to push the pellets towards a conveyor at the front end of the table.

The method may comprise an additional shoe emptying step, the shoe is then placed in an emptying position above orifices connected to suction means of the powder remaining in the shoe.

The shoe is then brought into the waiting position at rest at the end of the cycle.

The distributor and table assembly is particularly suitable for the fabrication of nuclear fuel pellets, for example from a MOX powder comprising a mix of uranium oxide, plutonium oxide and/or chamotte powders.

The invention claimed is:

1. Assembly for fabrication of pellets from a powder material comprising:
    a powder distributor,
    a table provided with cavities, on which the distributor is capable of moving, said powder distributor comprising a casing comprising a cover provided with means connecting it to at least one powder supply conduit connected to a hopper, two side walls and two end walls, said distributor being capable of moving the powder in a to and fro movement on a plane along a determined displacement direction (X), said assembly comprising
    means of guiding the distributor along the displacement direction and means of pressing the distributor in contact with the table, in which said guide means comprise at least two guide rollers installed on each side wall, said guide rollers having rotation axes (Z) perpendicular to a plane of the table, said guide rollers cooperating with a guide running track fixed relative to the table, and in which said pressure means comprise at least two pressure rollers on each side wall, said pressure rollers having rotation axes (Y1) perpendicular to the displacement direction (X) and parallel to the plane of the table, each pressure roller cooperating with a pressure running track fixed relative to the table, said pressure rollers being arranged only between the associated pressure running track and the table, and being capable of moving to and fro relative to the pressure running track, such that the pressure force is increased by moving the pressure rollers towards the associated pressure running track.

2. Assembly according to claim 1, comprising two rails fixed to the table on each side of the distributor and supporting the pressure running track and the guide running track.

3. Assembly according to claim 2, in which each rail has a C-shaped cross section open towards the distributor, the cross-section comprising a lower branch for attachment of the rail on the table and an upper branch supporting the pressure running track and the guide running track.

4. Assembly according to claim 1, comprising an adjuster to adjust the pressure force between the distributor and the table.

5. Assembly according to claim 4, in which the adjuster comprises an elastic means mounted free to react between two pressure rollers on one side wall and an elastic means mounted free to react between the two pressure rollers on the other side wall and means capable of modifying the preload on each of the elastic means.

6. Assembly according to claim 5, in which each pressure roller is mounted free to rotate on a part that is itself free to rotate on the side wall about an axis of rotation (Y2, Y3) parallel to the axis of rotation (Y1) of the pressure roller and separate from it, each elastic means being mounted bearing between the parts supporting the pressure rollers, variable length connector connecting the two parts to adjust the preload on the elastic means.

7. Assembly according to claim 6, in which the variable length connector comprises threaded rods connecting the two parts, each elastic means being free to rotate about a threaded rod, said threaded rods cooperating with the parts supporting the rollers by screwing.

8. Assembly according to claim 1, in which the cover comprises two bevelled end edges, one of the end walls of the distributor comprising at least one bevelled bill under which one of the bevelled end edges of the cover is located and the other end wall comprises a fixed part and a removable part provided with at least one bevelled bill that will bear on the other bevelled end of the cover.

9. Assembly according to claim 8, in which the fixed part comprises screws and the removable part is provided with U-lags inside which the screws fit.

10. Assembly according to claim 1, in which the table comprises several cavities and the distributor comprises means of grouping the powder along separate axes approximately parallel to the displacement direction (X), to fill the cavities, each cavity being located along a grouping axis, the grouping means being supported by walls of the casing perpendicular to the displacement direction (X) and having a saw tooth section along a plane parallel to the displacement plane.

11. Assembly according to claim 10, comprising downstream grouping means and upstream grouping means relative to the displacement direction (X).

12. Assembly according to claim 11, in which the cavities are arranged in at least one row (R1, R2), in which the downstream grouping means are offset transversely from the upstream grouping means by a half tooth width, such that one tooth tip is facing the bottom between two consecutive teeth, and in which the distance separating the cavities is equal to the distance separating the bottoms of the teeth, the distributor being arranged on the table so that when it moves, each bottom between two teeth covers a cavity in the table.

13. Pellet fabrication device comprising an assembly according to claim 1, a displacement actuator conferring a to and fro movement on the distributor along the first displacement direction (X), a hopper capable of containing a powder material and routing means to move the powder material from the hopper to the distributor.

14. Pellet fabrication device according to claim 13, in which the actuator is connected to the distributor through a swivel connection.

15. Pellet fabrication device according to claim 13, in which the powder material routing means comprise at least one supply conduit connected to the cover and to the hopper, the supply conduit comprising a pipe formed from metal turns embedded in a synthetic material, and connectors to each of its ends.

16. Pellet fabrication device according to claim 15, connectors being fixed to the cover and to the hopper by bolted articulated collars.

17. Pellet fabrication device according to claim 16, in which the bolted articulated collar fixed to one of the connectors connecting the conduit to the hopper is mounted on an articulated stirrup free to rotate on said connector.

18. Pellet fabrication device according to claim 17, in which the articulated rotation of the stirrup on said connector comprises a clearance along the axis of the connector and a transverse clearance.

19. Pellet fabrication device according to claim 15, comprising several supply conduits between the hopper and the distributor.

20. Pellet fabrication device according to claim 13, for the fabrication of nuclear fuel pellets.

* * * * *